Oct. 20, 1936.  A. C. LINDGREN  2,058,381

GRAIN CLEANING SCREEN

Filed June 6, 1934

Inventor
Alexis C. Lindgren
By V. F. Larraque
Atty.

Patented Oct. 20, 1936

2,058,381

UNITED STATES PATENT OFFICE 2,058,381

GRAIN CLEANING SCREEN

Alexus C. Lindgren, Chicago, Ill., assignor to International Harvester Company, a corporation of New Jersey Application June 6, 1934, Serial No. 729,180

9 Claims. (Cl. 209—394)

The invention relates to a grain separating screen.

The primary object of the invention is to provide in the so-called overlapped slat type of screen a novel structure presenting oppositely inclined grain and straw handling means in which the grain takes a course of travel down certain inclined passages, and the straw and chaff move in an oppositely inclined direction.

A further important object is to provide inclined passages in the slats down which the grain gravitates while a controlled and directed air stream or blast moves oppositely through the same passages to insure definitely that all straw and chaff will be effectively removed from the grain.

Another object is to provide continuous aligned, parallel track portions in the slats for the straw to ride down and over, thus insuring further that the straw particles will be separated from the grain.

In the drawing showing a practicable example of the invention:

The screen is employed in threshers and has adjustable hinged slats having a corrugated surface conformation designed for separating grain and chaff by means of confined and directed air currents moving upwardly from the bottom of the screen through grooved passages and openings between overlapping slats. The grain moves through the same passages against the air stream. By adjusting the slats about their hinges, or pivots, various kinds and differing volumes of grain or seed can be treated.

The screen frame comprises side bars 10 forming a frame which, it will be understood, is mounted in the usual shaking shoe when in use in a thresher. The side bars carry members 12 which carry rockable cross shafts 13, in spaced, parallel relation, said shafts at one end being cranked at 14 and carried in a shifter, adjusting bar 15. When the bar 15 is shifted, the cranks serve to rock the shafts 13 simultaneously. As will later appear this mechanism is for the purpose of changing the air flow through the screen slats, which will now be described.

Figure 3:
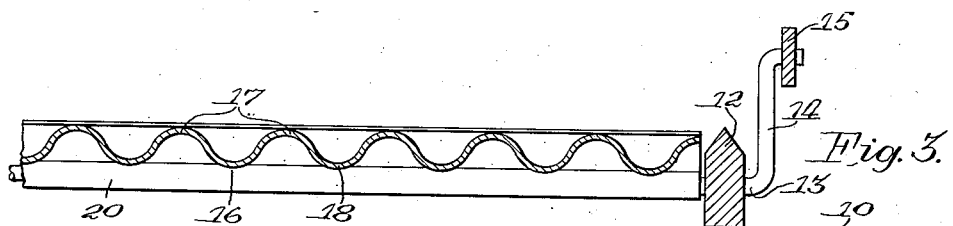
Figure 3 is a cross sectional view through adjacent overlapped slats, as seen along the line 3—3 appearing in Figure 1.
Figure 4:
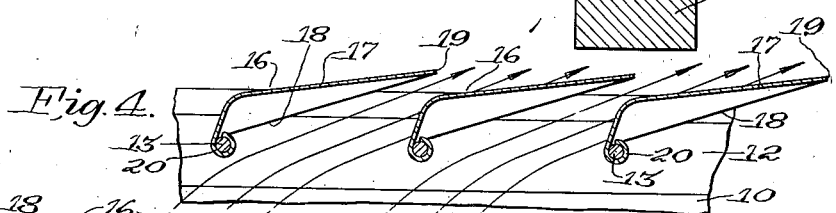
Figure 4 is a fragmentary portion of the structure, as shown in Figure 2, with the slats adjusted upwardly to increase the air flow; and, Figure 5 is a longitudinal sectional view through three overlapped sections along the dwell section line 6—6 appearing in Figure 1, to illustrate the air openings.

Each slat appears at 16 and each comprises a transversely disposed rectangular sheet metal plate arranged shingle-wise in overlapping relationship. Each slat is formed with a spaced, parallel series of longitudinally running corrugations presenting raised ridges or track portions 17 and adjacent or intermediate dwells 18. The track portions 17 are straight and normally horizontally disposed, while the dwells present an upwardly and forwardly inclined straight line, as seen in Figure 6. The straight line dwells 18 and the straight tracks 17 merge to form a horizontal straight edge 19 at the rear edge of each slat, as seen in Figure 3, while the front, or opposite, parallel, edge of each slat is curled at 20 around the adjacent shaft 13 and securely fastened thereto, so that, when a shaft 13 is rocked, its connected slat 16 also is rocked.

The overlapped slat construction thus provides a longitudinally aligned, parallel, spaced series of track portions 17 and between them a longitudinally aligned, parallel spaced series of upwardly inclined dwells providing air openings under the slats which terminate under the straight edges 19.

In use, an air blast is directed upwardly against the under side of the slats and mixed grain, straw and chaff is discharged onto the top surface of the screen.

Figure 1:
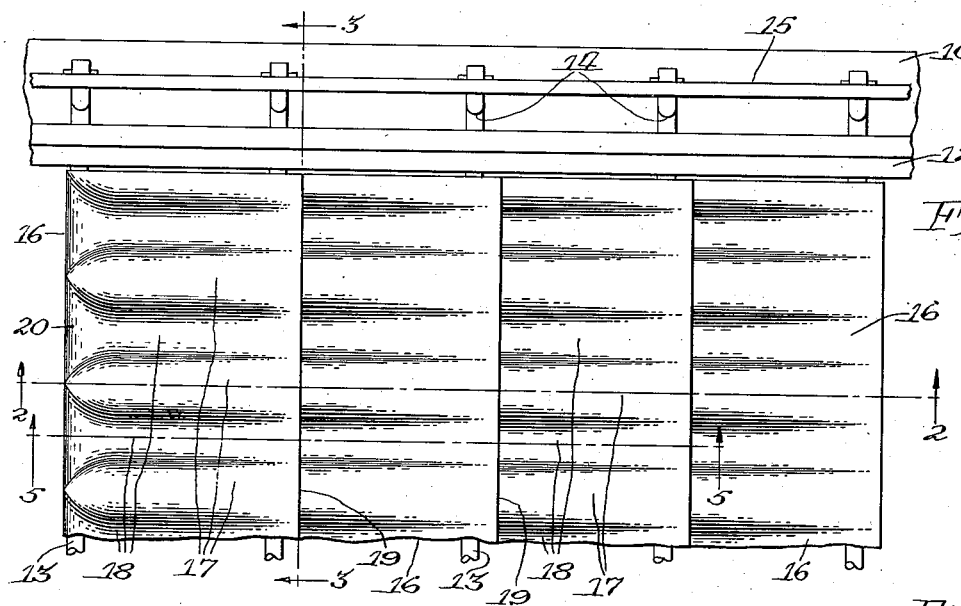
Figure 1 is a plan view of a fragmentary portion of the screen.
Figure 2:
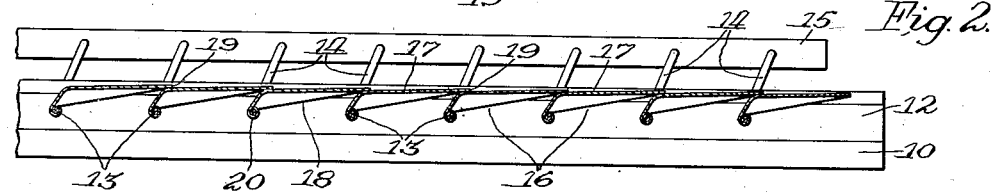
Figure 2 is a longitudinal sectional view through the aligned track portions of the corrugations of the overlapped slats, as seen along the line 2—2 appearing in Figure 1.

As the screen shakes fore and aft, this material is kept in a state of agitation, the heavier seed or grain particles sliding down the inclined dwells 18 by gravitation in opposition to the air blast moving through the air passages formed by the dwells 18, and through the screen into the usual auger or similar mechanism for receiving the grain, such mechanism not being shown, and usually disposed directly beneath the screen. As shown in Figure 2, for some conditions the slats contact one another, shingle fashion, thus definitely confining the air blasts to the space under the track ridges 17 between the grooves 18. Thus, as the grain moves down the grooves 18, it moves in opposition to these directed air streams thoroughly to clean the grain. Thus, the grain streams are inclined downwardly in one direction and the chaff and straw move in an opposite direction.

Figure 5:
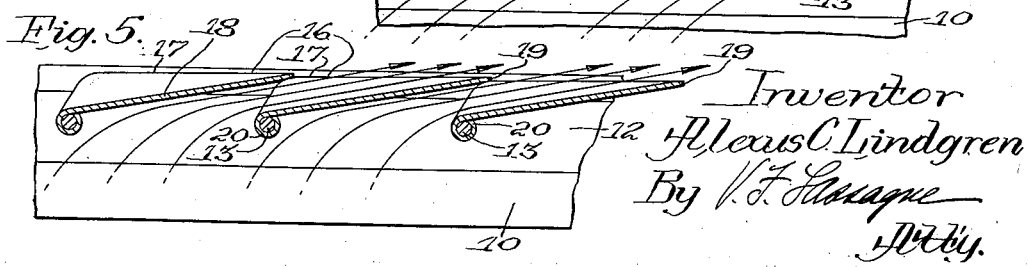

Each straight edge 19 may rest on the adjacent slat to leave only restricted air openings from the dwells 18, as shown in Figures 2 and 5; or, by means of the adjusted bar 15, these slats 16 can be tilted upwardly the desired amount to increase these air openings. Thus, as varying cleaning conditions are encountered, adjustments may be made to meet the changed condition, as desired.

The improved construction of each slat plate presents a surface bounded at its front and rear by parallel straight edges, the front edge being curled for direct pivotal connection to a crank rod shaft 13. Further, this surface is undulated by corrugations in a transversely spaced series to provide longitudinally running ridge portions lying in one plane which is substantially horizontal while the groove or dwell portions between these ridges lie in another plane disposed at an angle to the plane of the ridge portions. The spaces under the ridges taper from front to rear to provide air jet tunnels of a cross section increasing toward the rear straight edge of the slat plate for effectively directing the air upwardly and rearwardly. Still further, the front end of each ridge portion slopes rather abruptly downwardly with all such down-turned ridge edges lying in still another plane forming an angle with the plane in which lies the bottom edge of the groove or dwell portions. The three planes thus form a series of triangles. The importance of this is apparent for when the rear straight edge of one slat plate lies flatly on the front ends of the ridges of the adjacent slat plate, in shingle fashion, the air jet openings are not closed off but will still direct an ample supply of air upwardly and rearwardly for efficiently operating in such condition of adjustment of the screen.

From this disclosure it can now be seen that an improved and simple grain cleaning screen has been provided which utilizes the air blast in a manner most efficiently to separate grain from chaff.

It is the intention to cover all changes and modifications not departing from the spirit and scope of the invention, which has been defined in the appended claims.

What is claimed is:

1. A grain cleaning screen comprising a frame carrying a plurality of transverse slats arranged shinglewise with overlapped transverse edges, each slat having parallel front and rear straight edges and each slat being formed with corrugations providing longitudinal straight track portions on which the straw rides and longitudinal straight inclined groove portions between the ridge portions, said ridges and grooves forming passages for air which passages taper and serve to divide an air blast from under the screen into rearwardly moving divided streams, the grain moving down the groove portions against the air stream when the screen is agitated, said track portions all lying in a common plane, and the bottom of said grooves lying in another plane common to the grooves with both of said planes arranged non-parallel.

2. A grain cleaning screen comprising a frame, cross shafts rockably mounted therein in spaced relation, each shaft carrying a transverse slat, said slats being transversely disposed with the rear edge of one overlapping the forward edge of the adjacent slat, said slats being provided with aligned, longitudinal corrugations arranged in spaced relation to form straight raised track portions and straight inclined grooves therebetween which grooves are sloped at an angle relative to the track portions, the forward overlapping edge of each slat being straight and horizontally disposed.

3. A grain cleaning screen comprising a frame, cross shafts rockably mounted therein in spaced relation, each shaft carrying a transverse slat, with the slats having front straight edges directly connected to the shafts, said slats being transversely disposed with the rear edge of one overlapping the front edge of the adjacent slat, said slats being provided with aligned, longitudinal corrugations arranged in spaced relation to form raised track portions and straight inclined dwell portions therebetween, the dwell portions being disposed angularly relative to the track portions, and means for rocking the shafts to adjust the slats with respect to each other.

4. A screen for threshers comprising overlapped transverse slats formed with corrugations to provide aligned spaced longitudinal tracks lying in one plane for straw traveling toward the rear of the screen, and grooves therebetween which are disposed in another plane inclined with respect to the plane of the tracks to direct air streams upwardly toward the rear of the screen, the separated grain moving by gravity down the grooves in opposition to the air stream and in a direction toward the front of the screen.

5. A grain cleaning screen comprising a frame carrying spaced rockably mounted cross shafts, slats disposed transversely and having parallel straight edges, one of which edges in each slat is directly connected to an adjacent shaft to cause the slats to rock therewith, each slat having raised track portions formed longitudinally in spaced relation thereon with all track portions substantially disposed horizontally and in the same horizontal plane, each slat further having longitudinal grooves therein alternating with the track portions, the bottom edge of each groove being inclined relative to the track portions and lying in another plane forming an angle with the aforementioned plane, the slats being disposed shingle fashion with their adjacent edges overlapped.

6. A grain cleaning screen comprising a frame carrying spaced rockably mounted cross shafts, slats disposed transversely and having parallel front and rear straight edges, said slats each formed with spaced longitudinal raised track portions which lie in a common substantially horizontal plane, said track portions at their front ends being bent downwardly at an angle to merge with the front straight edge, which front straight edge is directly connected to a rock shaft, said slats further having grooves formed therein between the track portions with the grooves all lying in a common plane inclined relative to the aforementioned plane, the slats being disposed shingle fashion with the rear edge of one overlying the front edge of the adjacent slat.

7. A grain cleaning screen comprising a frame carrying spaced rockably mounted cross shafts, slats disposed transversely and having parallel front and rear straight edges, said slats each formed with spaced longitudinal raised track portions which lie in a common substantially horizontal plane, said track portions at their front ends being bent downwardly at an angle to merge with the front straight edge, which front straight edge is directly connected to a rock shaft, said slats further having grooves formed therein between the track portions with the grooves all lying in a common plane inclined relative to the aforementioned plane, the track portions tapering to form air passages therebelow which are of increasing cross sectional area from the front to the rear edge of the slats, whereby when the slats are folded shingle fashion onto one another the air passages will still be open to pass air.

8. A slat for a grain cleaning screen comprising a transversely disposed rectangular sheet of metal corrugated to provide raised track portions lying in the same plane and groove portions therebetween lying in another plane inclined to the first plane, the track portions at one end being bent downwardly to lie in a third plane, the three planes forming a triangular relationship of the portions mentioned, said slat having parallel straight edges with which the portions mentioned merge.

9. A slat for a grain cleaning screen comprising a transversely disposed rectangular sheet of metal corrugated to provide raised track portions lying in the same plane and groove portions therebetween lying in another plane inclined to the first plane, the track portions at one end being bent downwardly to lie in a third plane, the three planes forming a triangular relationship of the portions mentioned, said slat having parallel straight edges with which the portions mentioned merge, the groove portions having tapered side edges to form air passages below the slat having an increasing cross sectional area from one end to the other.

ALEXUS C. LINDGREN.